Patented Nov. 4, 1941

2,261,790

UNITED STATES PATENT OFFICE 2,261,790

PROCESS OF MANUFACTURING RUBBER ARTICLES

Byron W. Bender, Wanaque, N. J., assignor to United States Rubber Company, New York, N. Y., a corporation of New Jersey No Drawing. Application August 22, 1939, Serial No. 291,305

4 Claims. (Cl. 260—821)

This invention relates to a process of manufacturing rubber articles, and more particularly to a process of manufacturing rubber articles from heat-sensitive latex compositions.

The manufacture of rubber articles by processes involving the gelling of heat-sensitive latex compositions, as by dipping heated forms in a heat-sensitive latex, or by extruding the heat-sensitive latex through a heated nozzle, or by pouring a heat-sensitive latex into a mold and thereafter heating so as to gel the latex in the mold, is well known. It is known to wash the gelled mass in water before evaporating the water from the gel to form the finished rubber article. Where the latex is gelled on a form which remains in contact with the gel throughout the drying period, as in dipping, the washing of the gel is primarily for the purpose of removing water soluble substances from the gelled mass before drying said mass to form the finished rubber article. Where the gelled article is removed from the form after gelling, as in the case of articles gelled either in a hollow mold, or in a mold consisting of a shell and core, the water bath serves as a fluid supporting medium to permit the rubber gel to shrink or synerize without distortion. The syneresis, or shrinking of the gel and expression of water therefrom, in any case, toughens the gel sufficiently so that it may then be dried in a gaseous atmosphere without distortion.

The object of the present invention is to decrease the time of evaporative drying after syneresis of a latex gel.

Accordingly, I have discovered that after syneresis the treatment of a latex gel with an aqueous solution having a pH above 9 will greatly increase the rate at which water is evaporated therefrom during drying.

In carrying out one embodiment of the present invention, a heat-sensitive latex composition is gelled in the desired shape, and the gelled article is allowed to synerize in an aqueous bath. After syneresis the gel is treated with an aqueous solution having a pH above 9, after which it is further dried by the evaporation of water from the gel. The preparation of the heat-sensitive latex composition is well known. For example, the latex may be heat-sensitized by the addition thereto of a small amount of a heat-sensitizing agent, such as a polyvalent metal salt, or a disubstituted guanidine, or a mixture of zinc oxide and an ammonium salt of a strong acid. The latex may also be heat-sensitized in a known manner by the addition thereto of a small amount of a compound, such as ammonium persulphate, which forms an acid on heat decomposition, or by the addition of a material such as sodium silico fluoride, which, besides sensitizing the latex to heat, will cause it to gel at room temperature after standing a more or less extended period of time without the application of heat. The heat-sensitive latex may be gelled in various ways as by dipping a heated form into a bath of the heat-sensitive latex composition and building up the desired thickness of latex gel, or by dipping a form into the heat-sensitive gel, and removing, and thereafter heating to gel the latex, or by extrusion of the heat-sensitive latex through a heated nozzle, or by the extrusion of the heat-sensitive latex through a nozzle into a heated fluid medium, or by pouring the heat-sensitive latex into a mold and heating so as to gel the latex, or, where the heat-sensitive latex is also capable of gelling at normal temperatures, permitting the mold containing the latex, for example, to stand until such gelling has taken place.

The gelled latex is then allowed to synerize in an aqueous bath, by immersing the dipping mold coated with the latex gel in the bath, or by passing a continuous length of the gel through such a bath, or by removing the gelled article from the dipping form or casting mold, and allowing the article without the form to synerize in the bath. The gel may be permitted to remain in the bath until the desired effect has been accomplished, for example, until the gel has become sufficiently tough so that it can be further dried in a gaseous medium without distortion or uneven shrinking. After the gel has thus been allowed to synerize the desired extent, it is treated with an aqueous solution having a pH above 9, as by immersing the mold coated with the gel in such a bath or by dipping the gelled article which has been removed from the dipping form or casting mold into the bath, or by passing a continuous length of the gel through such a bath, or, if desired, by spraying an aqueous solution having a pH above 9 onto the surface of the gelled article. The pH of the treating bath may be adjusted in known manner by the addition to the water of any alkaline material. After the treatment of the gel with an aqueous solution having a pH above 9, it is transferred to a gaseous drying atmosphere, such as air, at room or elevated temperature, for further drying to produce the finished rubber article. After such evaporative drying, the article may be further heated or otherwise treated to vulcanize the same. The latex gel may be allowed to synerize in plain water for the desired period of time and may then be treated with the aqueous solution having a pH above 9 for a very short time, a few seconds generally being sufficient, before further evaporative drying. If desired, the bath for syneresis of the gel may have a pH above 9, in which case a separate operation for the treatment of the gel with the aqueous solution having a pH above 9 is unnecessary. Syneresis of the gel at pH's above 9 does not proceed at as fast a rate as syneresis at lower pH's, but the lower syneresis rate may well be compensated for by the elimination of a separate treatment. If desired, the gelled latex may be allowed to synerize at pH's below 5.5, as disclosed and claimed in the application of Hubert F. Jordan, Serial No. 291,306, filed Aug. 22, 1939, and after such syneresis treated for a few seconds or longer with an aqueous solution having a pH above 9 before the evaporative drying step.

The following is illustrative of the present invention: A latex composition was first prepared according to the following formula:

|  | Parts by weight (dry weight) |
| --- | --- |
| Rubber (as 60% centrifugal latex) | 100 |
| Ammonia | 0.2 |
| Potassium hydroxide | 1.3 |
| Potassium oleate | 1.0 |
| Sulphur | 2.0 |
| Antioxidant | 0.5 |
| Accelerator | 0.8 |
| Carbon black paste | 1.0 |
| Zinc oxide | 3.0 |
| Ammonium alginate | 0.2 |

Total solids 54%

The ammonia was reduced from the normal ammonia content of .65% to .2% by adding the calculated amount of formaldehyde to the latex. The compounding ingredients were added in the form of aqueous solutions, or pastes. The above compound was heat-sensitized shortly before use by the addition thereto of 10 parts (wet weight) of a 20% solution of ammonium nitrate containing .2% of added free ammonia, this solution together with the zinc oxide, acting to heat-sensitize the compound.

A number of gelled articles were made by pouring samples of the above into a three piece mold constructed of machined aluminum which when assembled had a rectangular internal cavity 7.5" square and .125" thick (7½" x 7½" x .125"). The latex samples in the mold were gelled irreversibly by immersing the mold containing the latex in a water bath heated to 90° C., from 5 to 10 minutes, after which the mold was removed from the water bath, opened, and the gelled articles or plates containing approximately 45% water removed. Samples of the gelled articles were allowed to synerize at 25° C. for 1 hour in (1) tap water (pH 8.5); (2) potassium carbonate buffer solution (pH 10.6); and (3) normal acetic acid half neutralized with sodium hydroxide (pH 4.5). After allowing to synerize for an hour, the samples were removed from the bath and dried in a current of air at a temperature of 80° C. under identical conditions. The syneresis of the gel at a pH of 8.5 reduced the water content from 45% to 41%; the syneresis of the gel at a pH of 10.5 reduced the water content from 45% to 43%; and the syneresis of the gel at a pH of 4.5 reduced the water content from 45% to 36%. Under the conditions existing in the drier, it took 7 hours to reduce the moisture content of the gel which was allowed to synerize at a pH of 8.5 to a value of 3.5%, 5 hours for the gel allowed to synerize at 10.6; and 8½ hours for the gel allowed to synerize at 4.5. Thus it may be seen that while articles which are allowed to synerize at a lower pH lose water more rapidly during syneresis than those allowed to synerize at higher pH's, the articles allowed to synerize at the higher pH's dry more rapidly. It is only necessary, however, in order that the increased rate of drying at higher pH's be obtained, that the gel be treated with an aqueous solution at the higher pH before evaporative drying, regardless of the pH of the bath in which the gel is allowed to synerize. For the maximum syneresis rate and maximum evaporative drying rate, the latex gel may be allowed to synerize at a low pH and then treated at a high pH before further drying by evaporation of water from the gel. This is clearly illustrated in the following: Two of the freshly gelled plates containing 45% water, were allowed to synerize for one hour in a 1% water solution of acetic acid (pH 4.2), which reduced the water content of the gels to 35%. Thereafter one of them was immersed for a few seconds in a potassium carbonate buffer solution having a pH of 10.5. Both samples were then placed in an air drier at 80° C. The control sample (untreated after syneresis) took 3½ hours for reduction of its water content to 8.8%, whereas the sample that after syneresis was treated with potassium carbonate solution, showed a reduction of its water content to 8.8% in only 2 hours and 20 minutes in the air drier. Similarly, for reduction of the moisture content to 5.4%, the control required 5½ hours; whereas the sample that after syneresis was treated with potassium carbonate solution, required only 3½ hours. The final size of the dried rubber plates was 6" x 6" x .10".

It is thus seen that the treatment of a latex gel before evaporation of the water in the gel with an aqueous solution having a pH above 9, increases the rate of evaporative drying. Where it is necessary to keep the number of operations to the minimum, the syneresis of the gelled latex may be permitted to take place at a pH above 9 thereby obtaining the desired increased drying rate. Where an additional manipulative step is not undesirable the syneresis may be made to take place at a pH below 5.5, for increased rate of syneresis, after which the additional treatment of the gel with an aqueous solution having a pH above 9, will increase the rate of evaporation of water from the gel, thereby providing both maximum syneresis and maximum evaporative drying effects. If desired, for convenience, the syneresis may be made to take place in plain water, after which the treatment with an alkaline solution having a pH above 9 before evaporative drying will increase the rate of evaporation of water from the gel.

In view of the many changes and modifications that may be made without departing from the principles underlying the invention, reference should be made to the appended claims for an understanding of the scope of the invention.

Having thus described my invention, what I claim and desire to protect by Letters Patent is:

1. The process of manufacturing a rubber article which comprises irreversibly gelling a latex composition containing a heat-sensitizing agent in the desired shape, allowing the gel to synerize for at least one hour in an aqueous bath, treating the gel after syneresis with an aqueous solution having a pH above 9, and then further drying the thus treated gel by evaporation.

2. The process of manufacturing a rubber article which comprises irreversibly gelling a latex composition containing a heat-sensitizing agent in the desired shape, allowing the gel to synerize for at least one hour in plain water, treating the gel after syneresis with an aqueous solution having a pH above 9, and then further drying the thus treated gel by evaporation.

3. The process of manufacturing a rubber article which comprises irreversibly gelling a latex composition containing a heat-sensitizing agent in the desired shape, allowing the gel to synerize for at least one hour in an aqueous bath having a pH below 5.5, treating the gel after syneresis with an aqueous solution having a pH above 9, and then further drying the thus treated gel by evaporation.

4. The process of manufacturing a rubber article which comprises irreversibly gelling a latex composition containing a heat-sensitizing agent in the desired shape, allowing the gel to synerize for at least one hour in an aqueous bath having a pH above 9, and then further drying the thus treated gel by evaporation.

BYRON W. BENDER.